United States Patent
Katayama et al.

(10) Patent No.: US 11,132,153 B2
(45) Date of Patent: Sep. 28, 2021

(54) COMMUNICATION METHOD AND PACKING BOX

(71) Applicant: SATO HOLDINGS KABUSHIKI KAISHA, Tokyo (JP)

(72) Inventors: Tamotsu Katayama, Tokyo (JP); Miki Ota, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/484,199

(22) PCT Filed: Apr. 10, 2018

(86) PCT No.: PCT/JP2018/015001
§ 371 (c)(1),
(2) Date: Aug. 7, 2019

(87) PCT Pub. No.: WO2018/198748
PCT Pub. Date: Nov. 1, 2018

(65) Prior Publication Data
US 2019/0369931 A1 Dec. 5, 2019

(30) Foreign Application Priority Data
Apr. 26, 2017 (JP) .............................. JP2017-086784

(51) Int. Cl.
*G06F 3/12* (2006.01)
*H04W 76/14* (2018.01)
*H04W 4/80* (2018.01)

(52) U.S. Cl.
CPC .......... *G06F 3/1231* (2013.01); *G06F 3/1204* (2013.01); *H04W 4/80* (2018.02); *H04W 76/14* (2018.02); *G06F 3/1292* (2013.01)

(58) Field of Classification Search
None
See application file for complete search history.

(56) References Cited

U.S. PATENT DOCUMENTS 7,602,292 B2 * 10/2009 Watanabe ........ G06K 19/07327
340/572.1
9,429,894 B2 * 8/2016 Mashiki ............. G03G 21/1652
(Continued)

FOREIGN PATENT DOCUMENTS

CN 1746907 A 3/2006
JP 2004-115057 A 4/2004
(Continued)

OTHER PUBLICATIONS

Extended European Search Report, Application No. 18791970.9, dated Apr. 1, 2020, 10 pages.
(Continued)

*Primary Examiner* — Dung D Tran
(74) *Attorney, Agent, or Firm* — Foley & Lardner LLP

(57) ABSTRACT

A communication method according to an embodiment of the present invention is performed between a communication device and an electrical apparatus by use of non-contact short-range wireless communication method. The electrical apparatus includes a built-in antenna in the vicinity of a first region of a surface exposed to the outside of the electrical apparatus. The antenna is provided for non-contact short-range wireless communication with the communication device. The communication method includes the steps of: preparing a storage box to which information is provided at a predetermined position on an exterior surface of the storage box, the information indicating where the antenna is placed; storing the electrical apparatus in power-off state, into the storage box, and thereby placing the electrical apparatus in the storage box such that the first region of the electrical apparatus is close to the predetermined position of the storage box; and moving the communication device close to the predetermined position of the storage box to
(Continued)

initiate communication between the communication device and the electrical apparatus.

15 Claims, 12 Drawing Sheets

(56) References Cited

U.S. PATENT DOCUMENTS

| | | | |
|---|---|---|---|
| 9,637,266 B2* | 5/2017 | Itano | B65D 5/32 |
| 10,528,776 B1* | 1/2020 | Levy | G06K 7/1413 |
| 2001/0019343 A1* | 9/2001 | Walker | B41J 2/17546 |
| | | | 347/19 |
| 2006/0054681 A1 | 3/2006 | Park et al. | |
| 2006/0192824 A1 | 8/2006 | Hatasa et al. | |
| 2009/0121835 A1* | 5/2009 | Borret | G06K 7/10346 |
| | | | 340/10.1 |
| 2011/0308986 A1* | 12/2011 | Lee | B65D 5/0254 |
| | | | 206/459.1 |
| 2015/0097030 A1* | 4/2015 | Gallo | H04B 5/0031 |
| | | | 235/439 |
| 2015/0280309 A1* | 10/2015 | Miyasaka | H02J 7/025 |
| | | | 343/702 |
| 2016/0138821 A1* | 5/2016 | Shaull | G05B 15/02 |
| | | | 700/276 |
| 2016/0241726 A1 | 8/2016 | Okamura et al. | |

FOREIGN PATENT DOCUMENTS

| | | | |
|---|---|---|---|
| JP | 2004115057 A | * | 4/2004 |
| JP | 2016-159480 A | | 9/2016 |
| JP | 2017-1335 A | | 1/2017 |

OTHER PUBLICATIONS

Chinese Office Action, Application No. 201880010001.0, dated Apr. 30, 2021, 8 pages.

* cited by examiner

COMMUNICATION METHOD AND PACKING BOX

The present invention relates to technology for communicating between a communication device and an electrical apparatus by use of non-contact short-range wireless communication method.

BACKGROUND ART

Conventionally, an electrical apparatus is known which is equipped with a communication tag for short-range wireless communication. For example, Japanese laid-open patent publication JP2017-1335 discloses a printer as such electrical apparatus. The printer includes: a power button disposed on the periphery of the front cover; and a communication tag surrounding the power button. When the printer is unpacked from a cuboid storage box by opening an upper face of the box, a communication terminal can be closer to the printer enough to communicate with the communication tag of the printer. Thus, it is described in the publication that workability is improved since work for reading information from and writing information to the communication tag of the printer can be performed without the printer being removed completely from the storage box.

SUMMARY OF THE INVENTION

Problems to be Solved by the Invention

However, with the electrical apparatus mentioned above, a worker needs to open a part of the storage box to allow the communication terminal to communicate with the communication tag. In this respect, workability may be further improved.

In view of the above, the present invention aims to enable non-contact short-range wireless communication between an electrical apparatus and an external communication device when the electrical apparatus is packed in a storage box, without storage box being opened.

Means for Solving the Problems

An embodiment of the present invention is a communication method between a communication device and an electrical apparatus by use of non-contact short-range wireless communication method, the electrical apparatus including a built-in antenna in the vicinity of a first region of a surface exposed to the outside of the electrical apparatus, the antenna being provided for non-contact short-range wireless communication with the communication device, the method including the steps of: preparing a storage box to which information is provided at a predetermined position on an exterior surface of the storage box, the information indicating where the antenna is placed; storing the electrical apparatus in power-off state, into the storage box, and thereby placing the electrical apparatus in the storage box such that the first region of the electrical apparatus is close to the predetermined position of the storage box; and moving the communication device close to the predetermined position of the storage box to initiate communication between the communication device and the electrical apparatus.

Effect of the Invention

According to an embodiment of the present invention, it is enabled non-contact short-range wireless communication between an electrical apparatus and an external communication device when the electrical apparatus is packed in a storage box, without storage box being opened.

DETAILED DESCRIPTION OF THE INVENTION

The present invention relates to a Japanese patent application filed before Japan Patent Office on Apr. 26, 2017, entire content of which is incorporated by reference in the specification of the present application.

In the present disclosure, "providing information to a storage box" may mean displaying or describing information, with regard to the storage box itself, an object attached to the storage box, or an object mounted on the storage box. For example, describing information with regard to a storage box may mean "providing information to the storage box." Printing or describing information on a label attached to a storage box or a tag mounted on a storage box may mean "providing information to the storage box."

In the present disclosure, "moving a communication device close to a predetermined position" may mean moving the communication device so close to the predetermined position that the communication device is able to communicate according to a communication protocol, and does not necessarily mean that the communication device is caused to come into contact with the predetermined position. Distance of the communication device to the predetermined position at which the communication device is able to communicate may vary depending on factors such as performance of the communication device and communication protocol applied.

A product package, which is an embodiment of a storage box according to the present invention, will be described below. The product package stores an electrical apparatus. In the present embodiment, a mobile printer is presented as an example of the electrical apparatus; however, the electrical apparatus is not limited to a mobile printer, but may be other kind of apparatus such as a digital camera, a video camera, or a personal computer.

(1) Shipping unit

Figure 1:
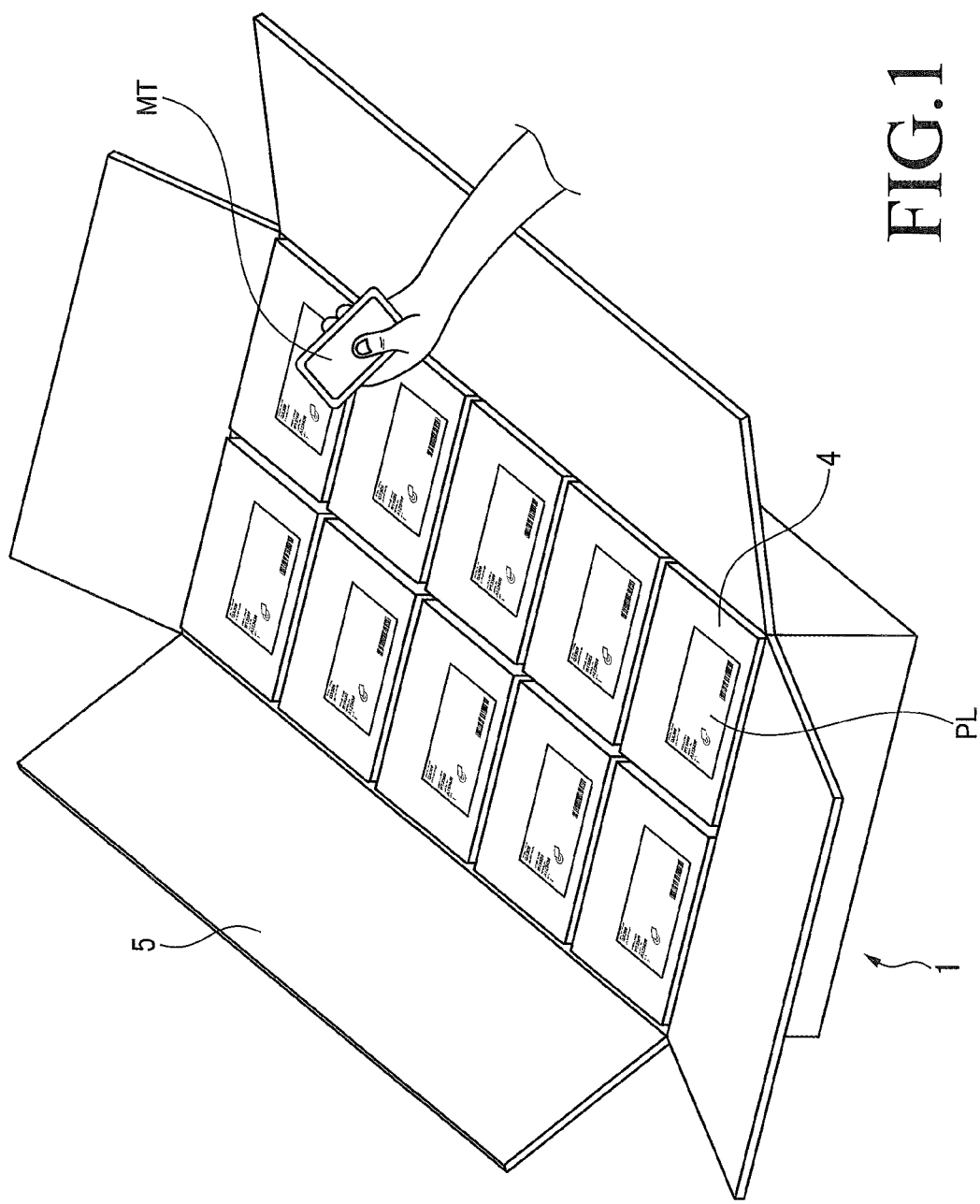
FIG. 1 is a perspective view of a shipping unit that stores a product package according to an embodiment, with the top face opened.
Figure 2:
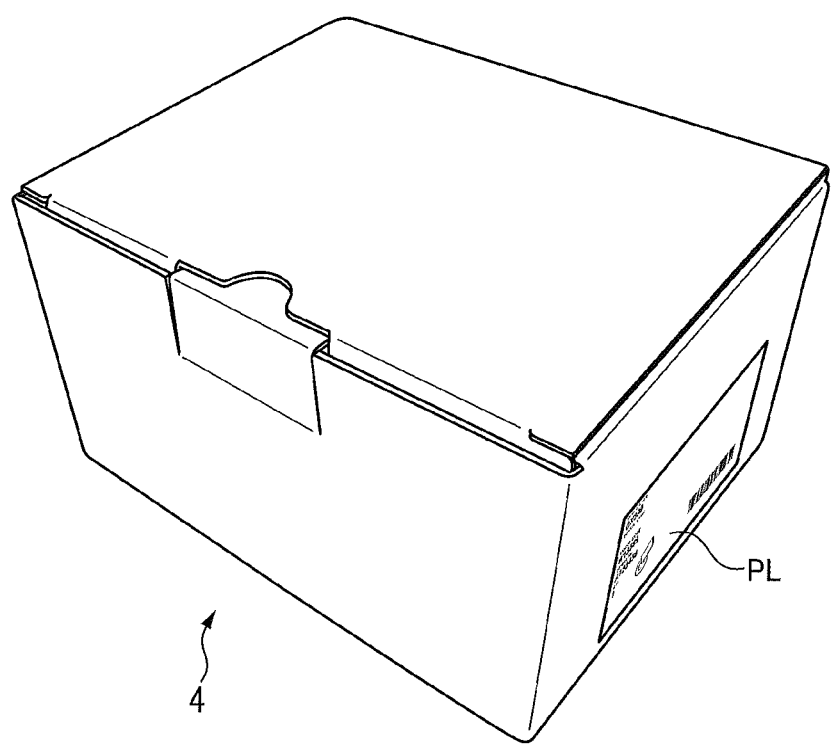
FIG. 2 is a perspective view of the product package according to the embodiment.
Figure 3:
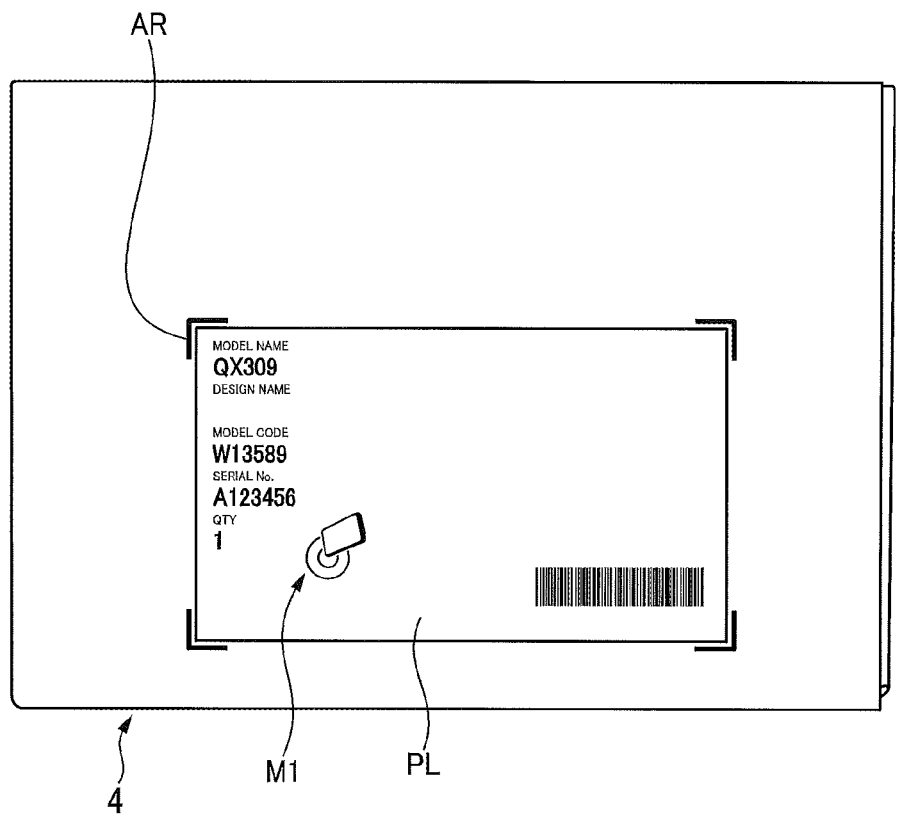
FIG. 3 is a lateral view of the product package according to the embodiment.

A shipping unit 1 according to the present embodiment will be described with reference to FIGS. 1 to 3 below. FIG. 1 is a perspective view of the shipping unit 1 that stores a product package according to the present embodiment, with the top face opened. FIG. 2 is a perspective view of the product package 4 according to the present embodiment. FIG. 3 is a lateral view of the product package 4 according to the present embodiment.

The shipping unit 1 is a unit for shipping mobile printers as electrical apparatuses from a manufacturing plant or a warehouse for pickup, for example. As illustrated in FIG. 1, a plurality of product packages 4 (ten packages in an example of FIG. 1) is aligned and stored in a container box 5. A quantity of product packages 4 in the shipping unit 1 may be determined as appropriate based on size of the container box 5.

As illustrated in FIGS. 2 and 3, the product package 4 according to the present embodiment has roughly a cubic shape. A label PL is attached on an exterior surface of the product package 4. In an example of FIG. 2, the label PL is attached on a lateral face of the product package 4; however, a surface on which the label PL is attached may not be the lateral face of the product package 4.

As illustrated in FIG. 3, printed on the label PL are: a model name, a model code, a serial number, and a quantity of printers included in the product package 4. Further, a communication mark M1 is printed on the label PL. The communication mark M1 is provided for a worker to read information from or write information to the printer in the product package 4 by use of a communication device MT. As described later, the present embodiment enables non-contact short-range wireless communication between the communication device MT and the printer in the product package 4 by moving the communication device MT by a worker close to the communication mark M1. A protocol defined as ISO/IEC 18092 (Near Field Communication (NFC) in the restricted meaning) or ISO/IEC14443 (proximity RFID) may be applied for non-contact short-range wireless communication, for example.

The communication device MT may be a smart phone, a tablet terminal, a laptop-type computer device, for example.

As illustrated in FIG. 1, the product packages 4 are preferably placed so that, when an upper face of the shipping unit 1 is open, a surface of each product package 4 on which the label PL of each product package 4 in the container box 5 is attached, is directed toward the upper face of the shipping unit 1. With such placement of the product packages 4, a worker is able to move the communication device MT close to the communication mark M1 of all product packages 4 in the shipping unit 1, only by opening the upper face of the shipping unit 1. Then, information can be read from or written to the printer in each product package 4, without the product packages 4 being removed from the container box 5.

(2) Printer an Product package

Figure 4:
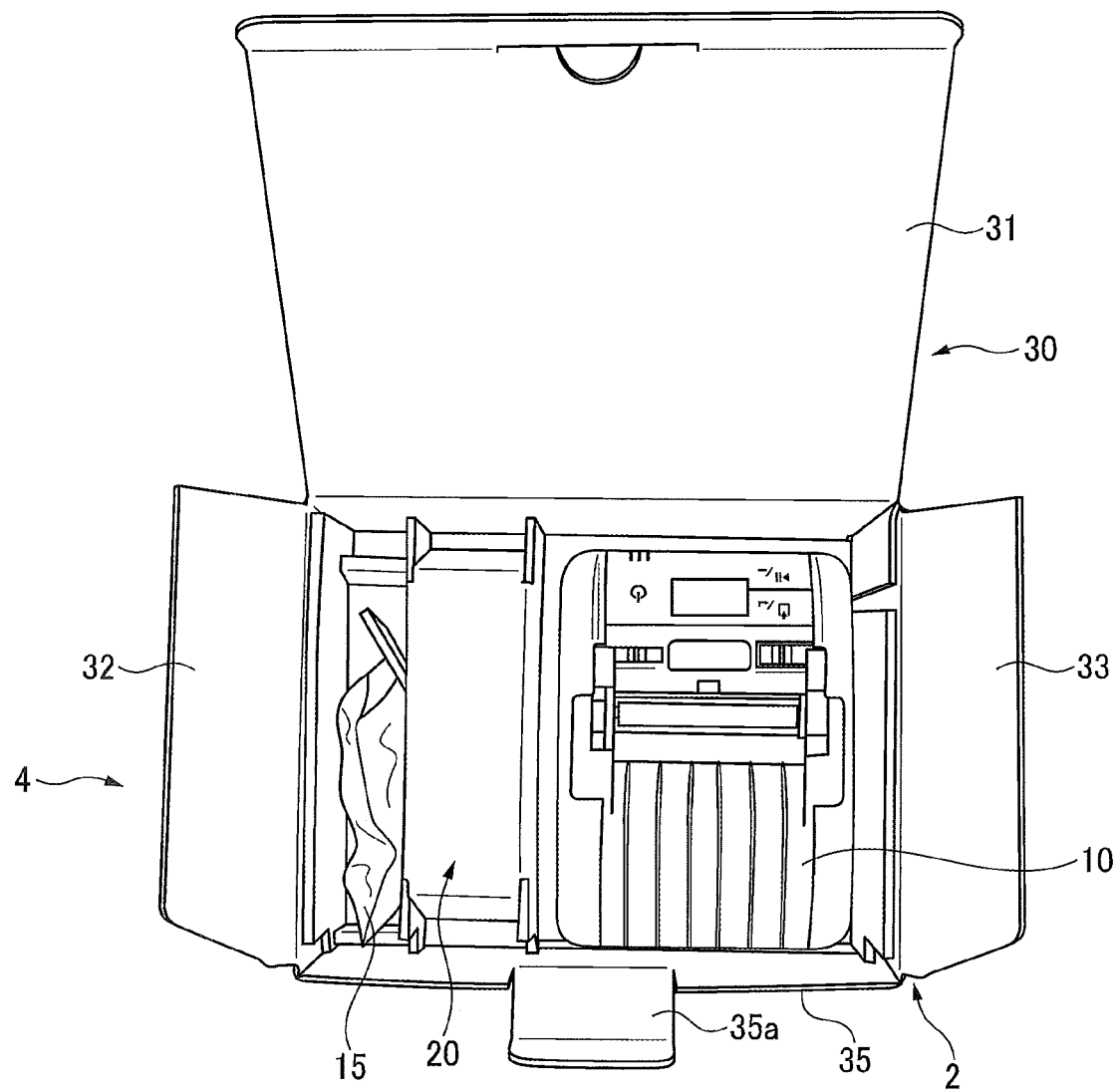
FIG. 4 is a perspective view of the product package according to the embodiment, with the top face opened.
Figure 5:
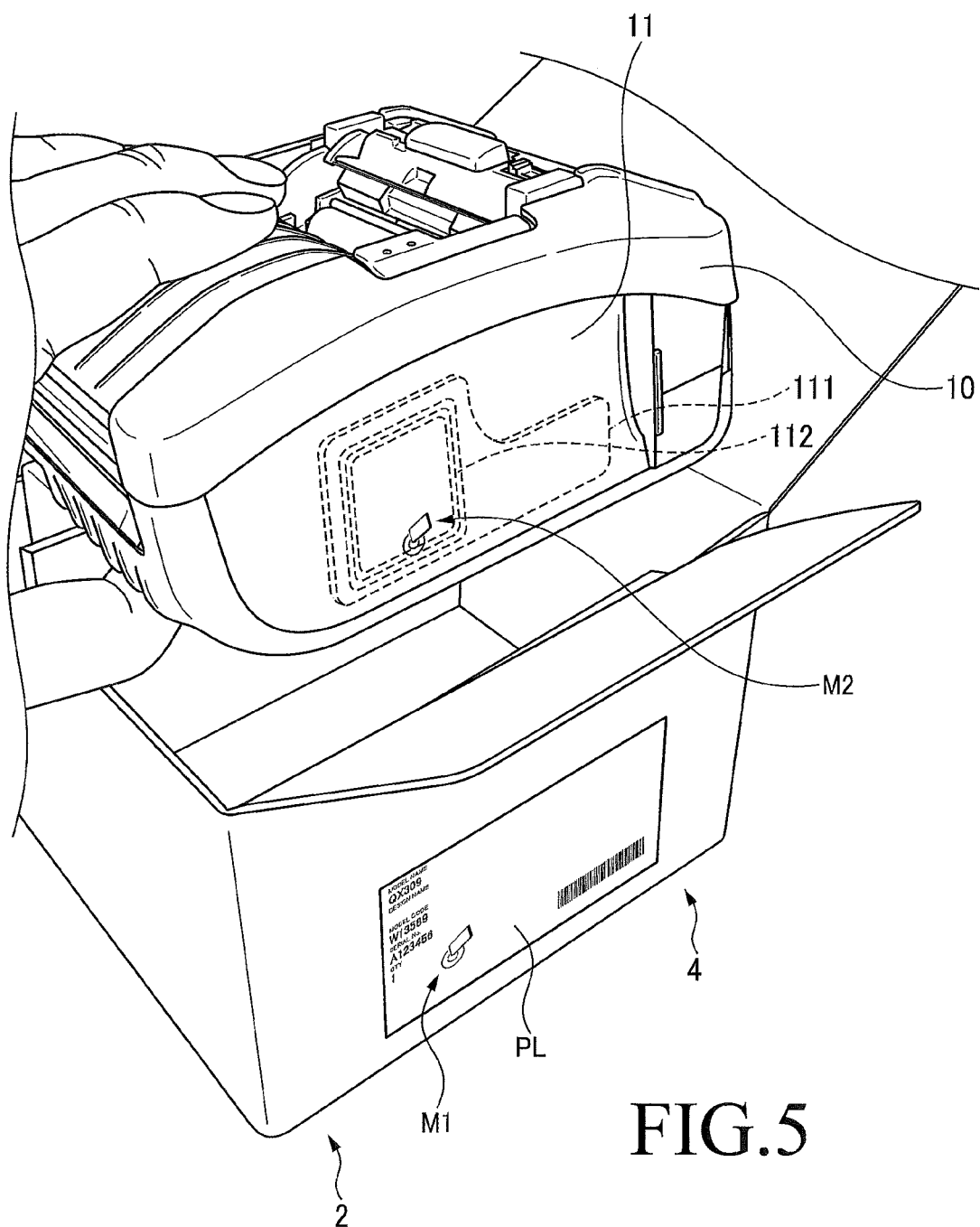
FIG. 5 is a perspective view of a storage box according to the embodiment and a printer as an electrical apparatus.
Figure 6:
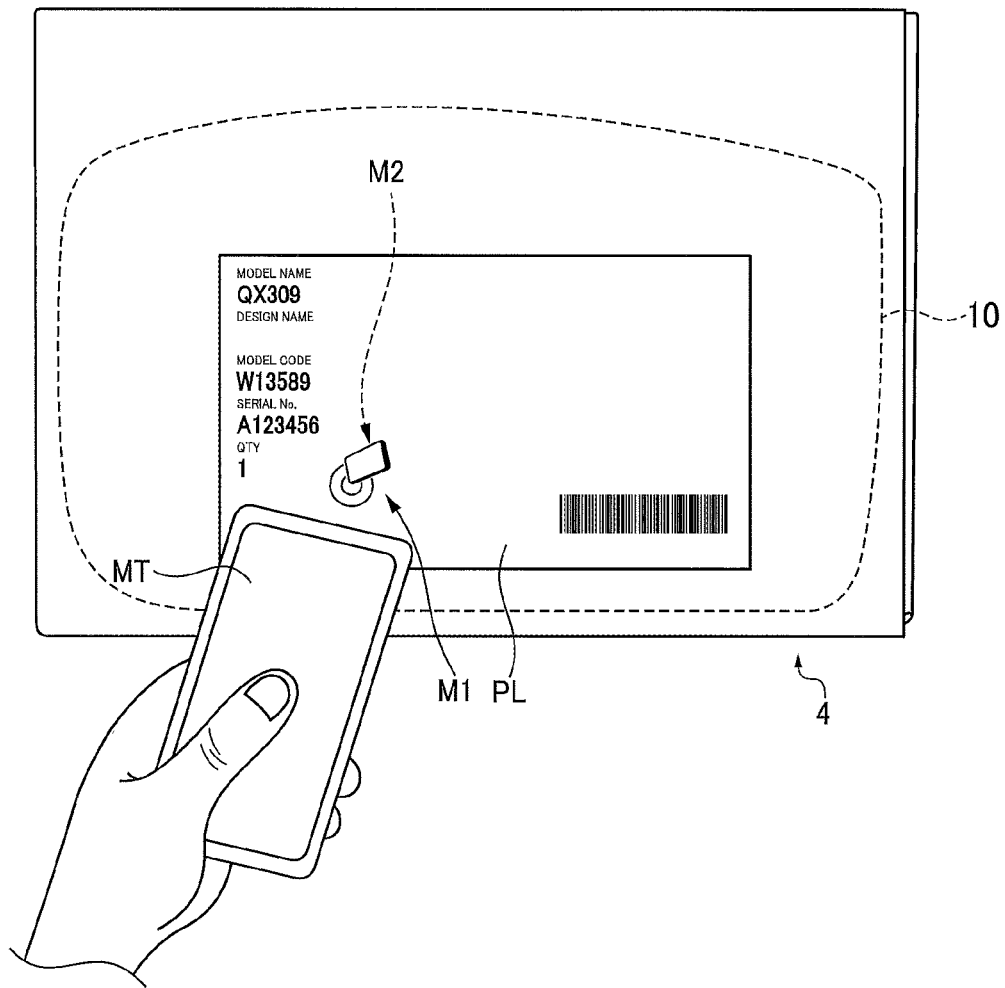
FIG. 6 illustrates a state in which communication is performed between a printer in the storage box and an external communication device.

Next, a printer 10 and the product packages 4 according to the present embodiment will be described with reference to FIGS. 4 to 6. FIG. 4 is a perspective view of the product package 4 according to the present embodiment, with the top face opened. FIG. 5 is a perspective view of the storage box 2 according to the present embodiment and the printer 10 as an electrical apparatus. FIG. 6 illustrates a state in which communication is performed between the printer 10 in the storage box 2 and the communication device MT which is present outside.

As illustrated in FIG. 4, the product package 4, which is handed off to a distributor or a purchaser, includes the printer 10 and accessories 15 of the printer 10 stored in the storage box 2. The accessories 15 may be a cable for battery charge, for example.

The storage box 2 includes an exterior member 30 and an interior member 20. The exterior member 30 has a cuboid shape. Exterior faces of the exterior member 30 form exterior faces of the storage box 2. The interior member 20 is located inside of the exterior member 30. As illustrated in FIG. 4, preferably, the printer 10 and the accessories 15 are located in the storage box 2, with the printer 10 and the accessories 15 partitioned by the interior member 20. Thus, degree of freedom for movement of the printer 10 and the accessories 15 inside the storage box 2 is very little. In order to even decrease degree of freedom for movement of the printer 10, cushioning material (bubble wrap, for example) may be located in at least a part of circumference of the printer 10.

FIG. 5 shows a status in which the printer 10 is inserted into the storage box 2 when the product package 4 is manufactured. As illustrated in FIG. 5, a communication mark M2 is provided on a lateral face 11 of a housing exposed to the outside of the printer 10. The communication mark M2 has the same shape as the communication mark M1 that is displayed on the label PL. The communication mark M2 is displayed to make a worker recognize a proper position for performing short-range wireless communication with the printer 10. The printer 10 includes a circuit board 111 inside in the vicinity of a region (an example of a first region) in which the communication mark M2 is provided. A communication tag 112 is implemented on the circuit board 111. The communication tag 112 includes an IC chip and an antenna.

It should be noted that "the circuit board in the vicinity of a first region" may mean that the circuit board is spaced apart by thickness of the housing of the printer. Alternatively, when seen from a direction orthogonal to a face of the housing of the printer 10, the circuit board may be located so that there is overlapped area of the first region (i.e., a region in which the communication mark M2 is provided) and the communication tag 112.

When the product package 4 is manufactured, the printer 10 in power-off state, oriented in the direction shown in FIG. 5, is stored into the storage box 2. Thereby, in the product package 4, the communication mark M2, which is provided on a lateral face 11 of the housing of the printer 10, come close to the communication mark M1, which is displayed on the label PL of the storage box 2. Thus, even when the storage box 2 that stores the printer 10 is closed (that is, in the state of the product package 4), a worker can recognize from the outside a position at which the communication device MT is able to perform short-range wireless communication with the communication tag 112 of the printer 10.

It is preferable that a position at which the label PL is attached to the storage box 2 is highly accurate in order to realize accurate positioning of the communication mark M1 and the communication mark M2. In this aspect, as illustrated in FIG. 3, a positioning mark AR for attachment may be preferably provided on the storage box 2. In an example of FIG. 3, positioning marks AR at four locations may be provided corresponding to four vertexes of the rectangular label PL; however, other arrangement may be applied. Positioning marks AR at two locations may be provided corresponding to two vertexes of the label PL.

As illustrated in FIG. 6, in the product package 4, the position of the communication mark M1 of the label PL corresponds to the position of the communication mark M2, which is displayed on the printer 10, when seen in the lateral view of FIG. 6. Thus, moving the communication device MT close to the communication mark M1 is equivalent of moving the communication device MT close to the communication mark M2. Therefore, after the product package 4 is manufactured, a worker moves the communication device MT close to the communication mark M1 of the label PL attached to the product package 4, thereby initiating short-range wireless communication between the communication device MT and the printer 10 stored in the product package 4.

Particularly, since the printer 10 exemplified in the present embodiment is a relatively small mobile printer, it may not be possible to design the antenna of the communication tag 112 so as to be larger. Even in such case, it is possible to precisely correspond the position of the communication mark M1 to the position of the communication mark M2. Consequently, stable short-range wireless communication can be realized.

(3) Structure of Storage box

Next, structure of the storage box 2 according to the present embodiment will be described with reference to FIGS. 7 to 11.

Figure 7:
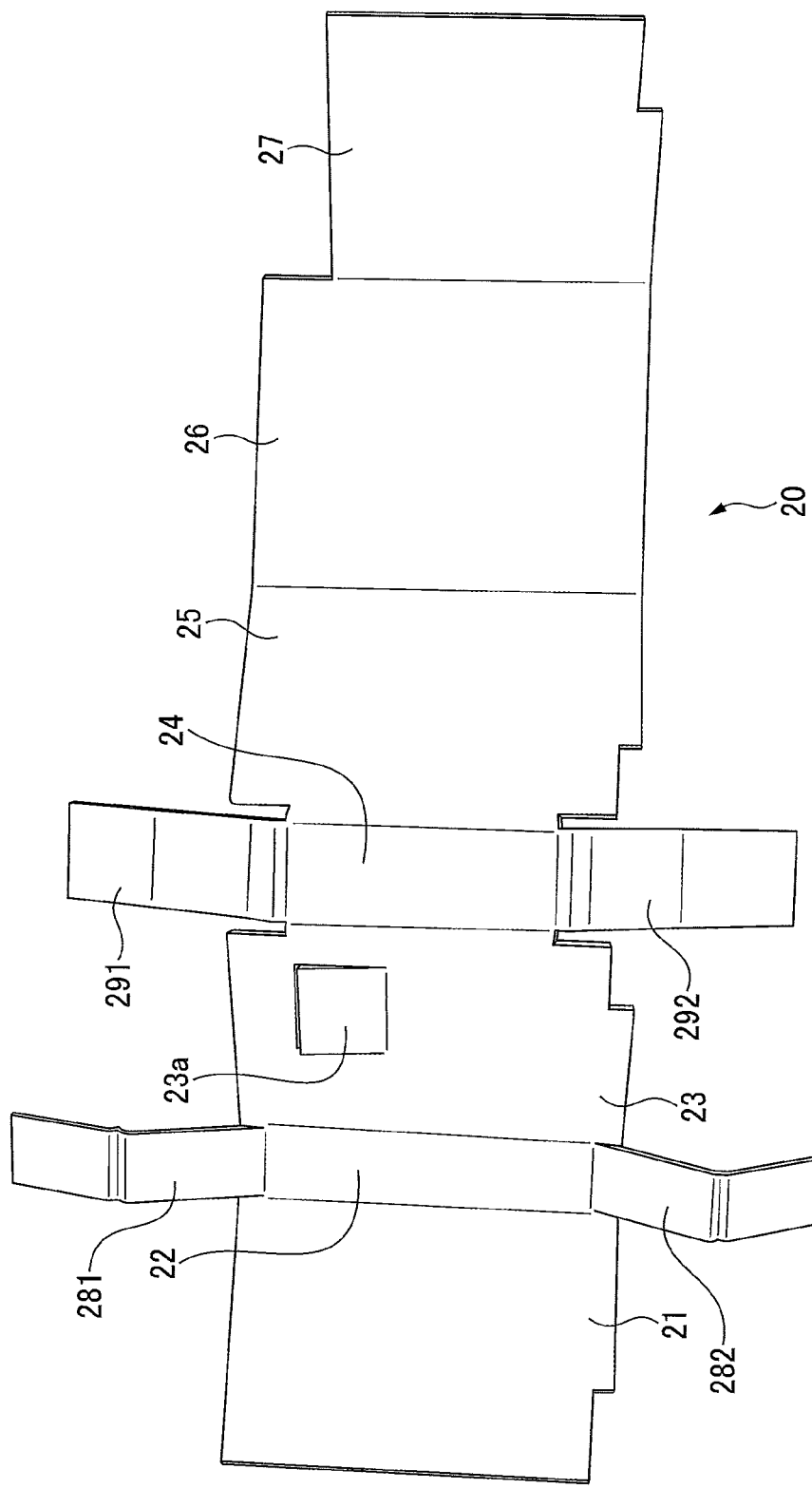
FIG. 7 is a plan view showing an embodiment of an interior member of the storage box according to the embodiment, before the interior member is unassembled.
Figure 8:
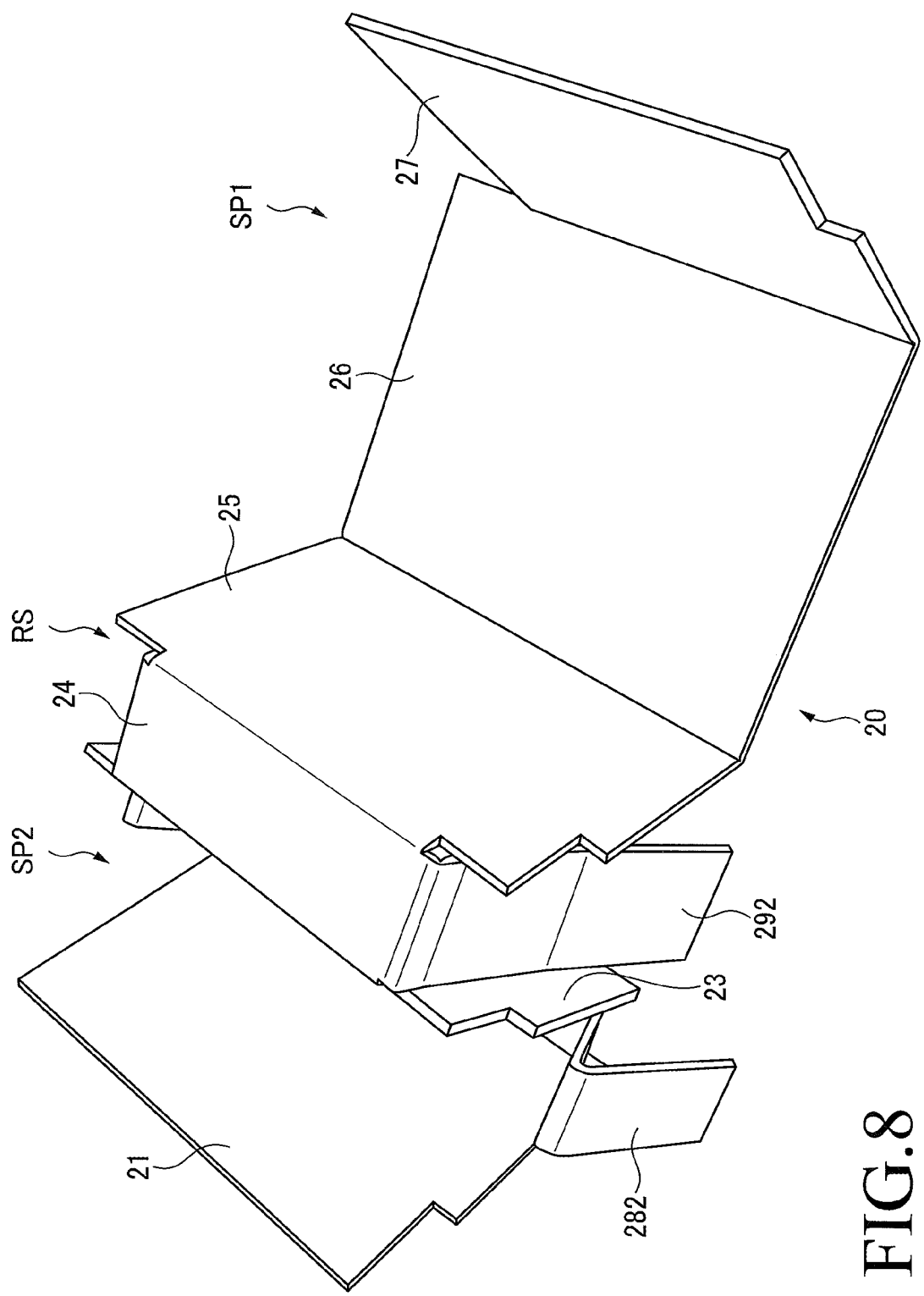
FIG. 8 is a perspective view showing an embodiment of an interior member of the storage box according to the embodiment, before the storage box is unassembled.
Figure 9:
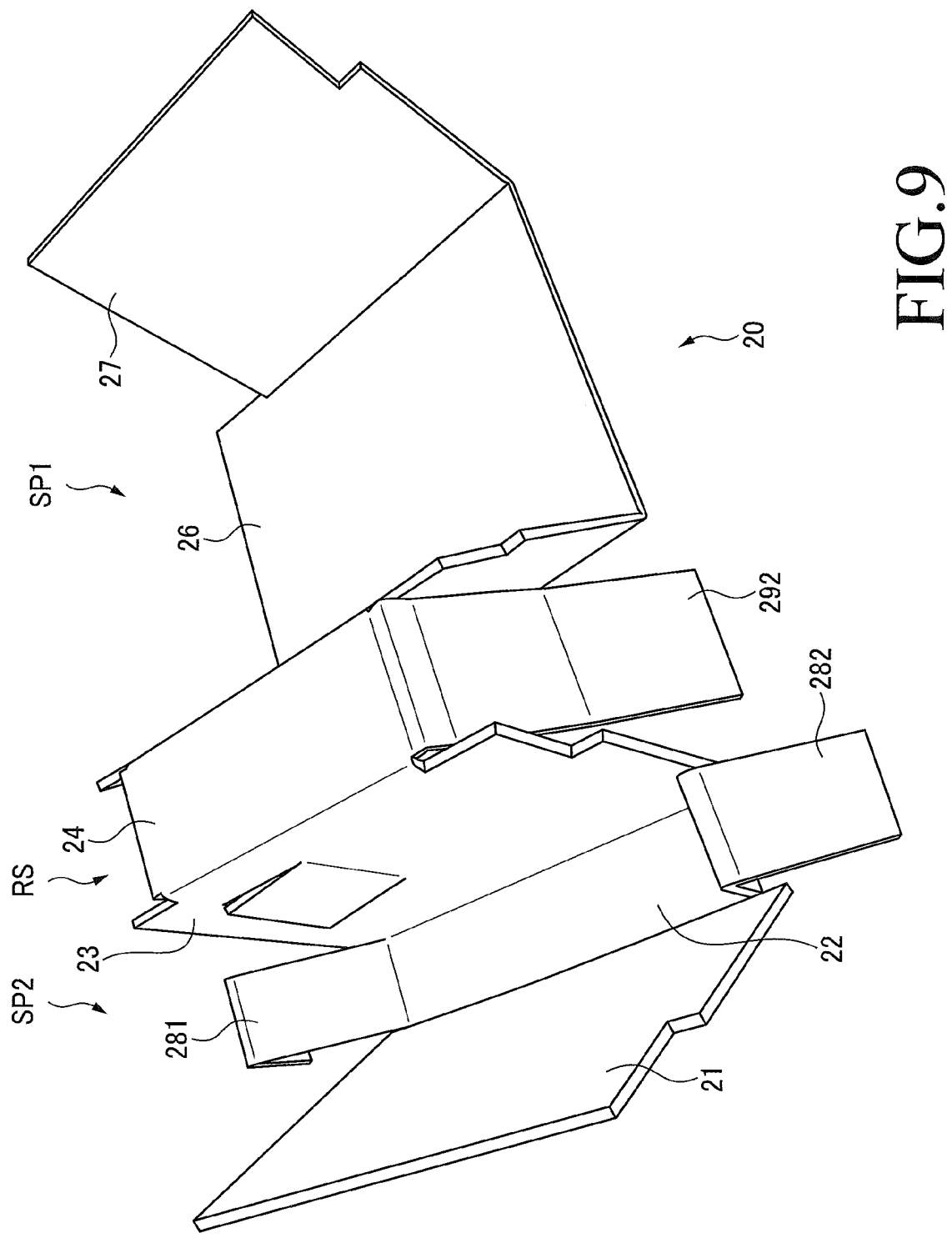
FIG. 9 is another perspective view showing the embodiment of the interior member of the storage box according to the embodiment, before the storage box is unassembled.
Figure 10:
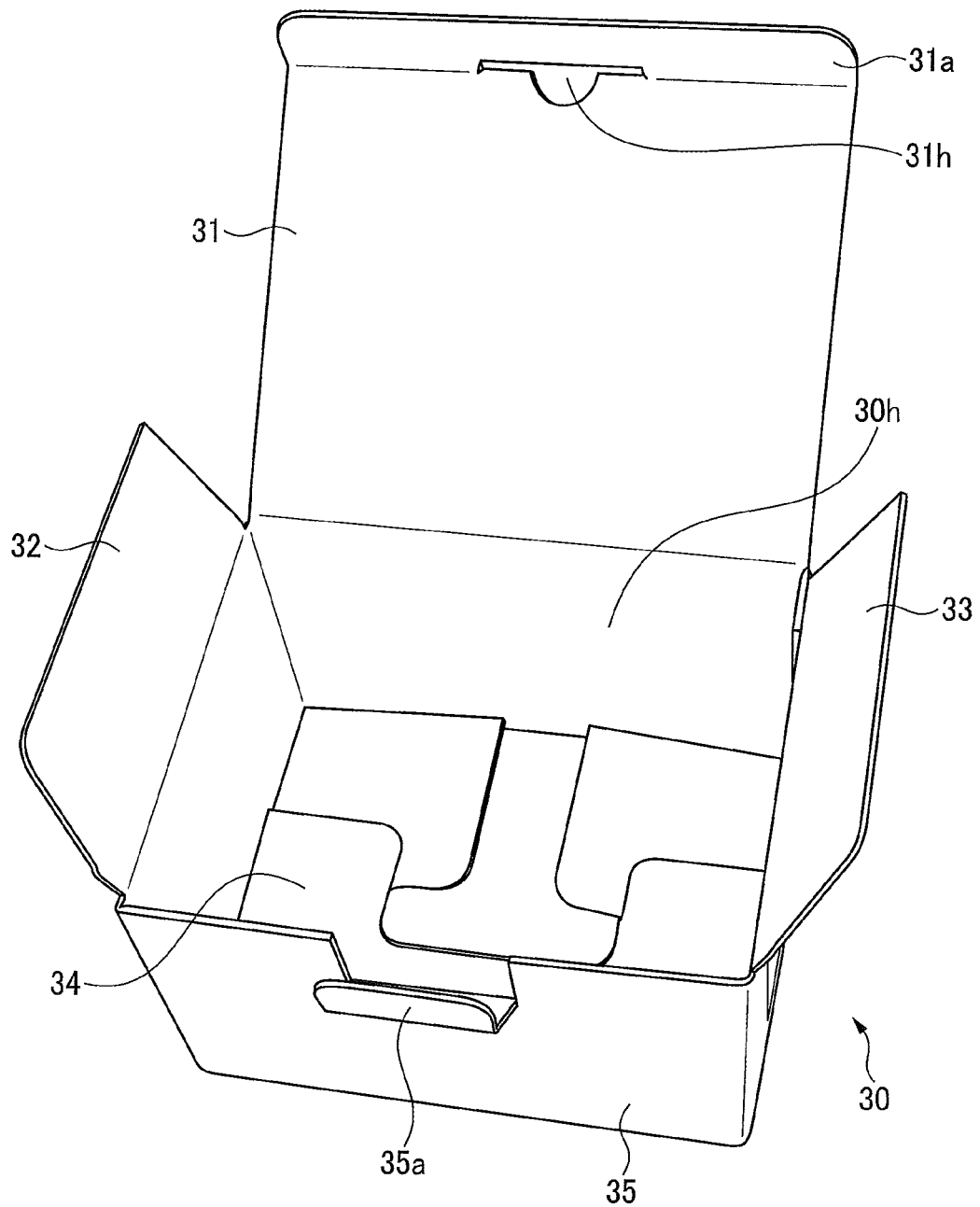
FIG. 10 is a perspective view showing an embodiment of an exterior member of the storage box according to the embodiment, before the storage box is unassembled.
Figure 11:
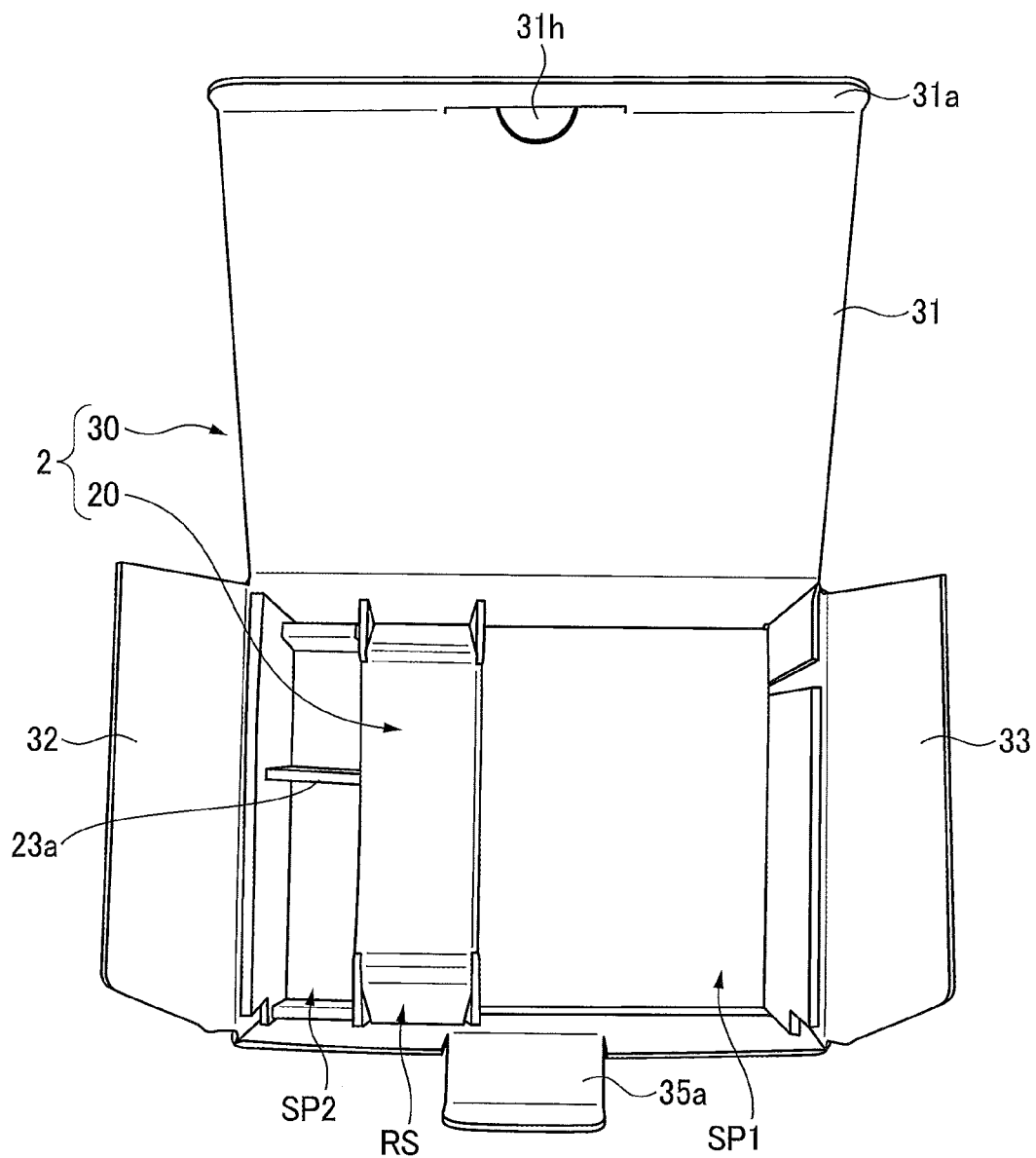
FIG. 11 is a plan view showing the embodiment of the exterior member of the storage box according to the embodiment, before the storage box is unassembled.

FIG. 7 is a plan view showing an embodiment of the interior member 20 of the storage box 2 according to the embodiment, before the interior member 20 is unassembled. FIGS. 8 and 9 are perspective views, seen from different viewpoints, showing an embodiment of the interior member 20 of the storage box 2 according to the embodiment, before the storage box 2 is unassembled. FIG. 10 is a perspective view showing an embodiment of the exterior member 30 of the storage box 2 according to the embodiment, before the storage box 2 is unassembled. FIG. 11 is a plan view showing the embodiment of the exterior member 30 of the storage box 2 according to the embodiment, before the storage box 2 is unassembled.

As illustrated in FIG. 7, the interior member 20 of the storage box 2 is comprised of flat members that include flat plates 21 to 27, 281 to 282, and 291 to 292. Material of the members may be, but is not limited to, paper for example.

As illustrated in FIG. 8, the interior member 20 is valley-folded at a boundary between the flat plate 25 and the flat plate 26, and valley-folded at a boundary between the flat plate 26 and the flat plate 27. Then, space SP1 is formed. The flat plate 26 is formed as a bottom face of the space SP1, while the flat plates 25 and 27 are formed as side wall surfaces of the space SP1. The printer 10 is stored in the space SP1 (see FIG. 4).

As illustrated in FIG. 9, the interior member 20 is valley-folded at a boundary between the flat plate 21 and the flat plate 22, valley-folded at a boundary between the flat plate 22 and the flat plate 23, and valley-folded at a boundary between the flat plate 22 and the flat plates 281, 282. Then, space SP2 is formed. The flat plate 22 is formed as a bottom face of the space SP2, while the flat plates 21, 23, 281, and 282 are formed as side wall surfaces of the space SP2. The accessories 15 is stored in the space SP2 (see FIG. 4). It is to be noted that a bent strip 23a of the flat plate 23 is provided to partition the space SP2 in two (see FIG. 11).

As illustrated in FIGS. 8 and 9, the interior member 20 is mountain-folded at a boundary between the flat plate 23 and the flat plate 24, and mountain-folded at a boundary between the flat plate 24 and the flat plate 25. Then, a restriction part RS is formed. The restriction part RS restricts placement of the printer 10 in the storage box 2 so that, when the printer 10 is placed in the space SP1, the communication mark M2 of the printer 10 comes close to an interior surface of the storage box 2 (more specifically, a surface of the flat plate 27).

At the restriction part RS, the interior member is mountain-folded at a boundary between the flat plates 291, 292 and the flat plate 24. Thereby, both lateral end parts of the flat plates 291, 292 abut on the flat plate 23 and the flat plate 25. Thus, even in a case in which strong force is applied to the printer 10, the flat plate 25 effectively supports the printer 10. For example, strong force may be applied to the printer 10 with vibration in transportation of the product package 4 or impact in drop of the product package 4. Even in such case, a position of the printer 10 in the storage box 2 does not change.

As illustrated in FIG. 10, the exterior member 30 of the storage box 2 has a cuboid shape wholly in which a storage space 30h is formed. The exterior member 30 includes a lid part 31, flat plate parts 32, 33, a bottom part 34, and a lateral part 35.

As illustrated in FIG. 11, the assembled interior member 20 is inserted in the storage space 30h of the exterior member 30 to complete the storage box 2. In order to close the storage box 2, each of the lid part 31 and the flat plate parts 32, 33 is mountain-folded with respect to the lateral part 35. Then, an end part 31a of the lid part 31 is caused to come in contact with an interior surface of the lateral part 35, and an engagement part 35a of the lateral part 35 is caused to engage with a cutout part 31h of the lid part 31 (see also FIG. 2).

(4) Configuration of the Printer 10 and the Communication Device MT

Figure 12:
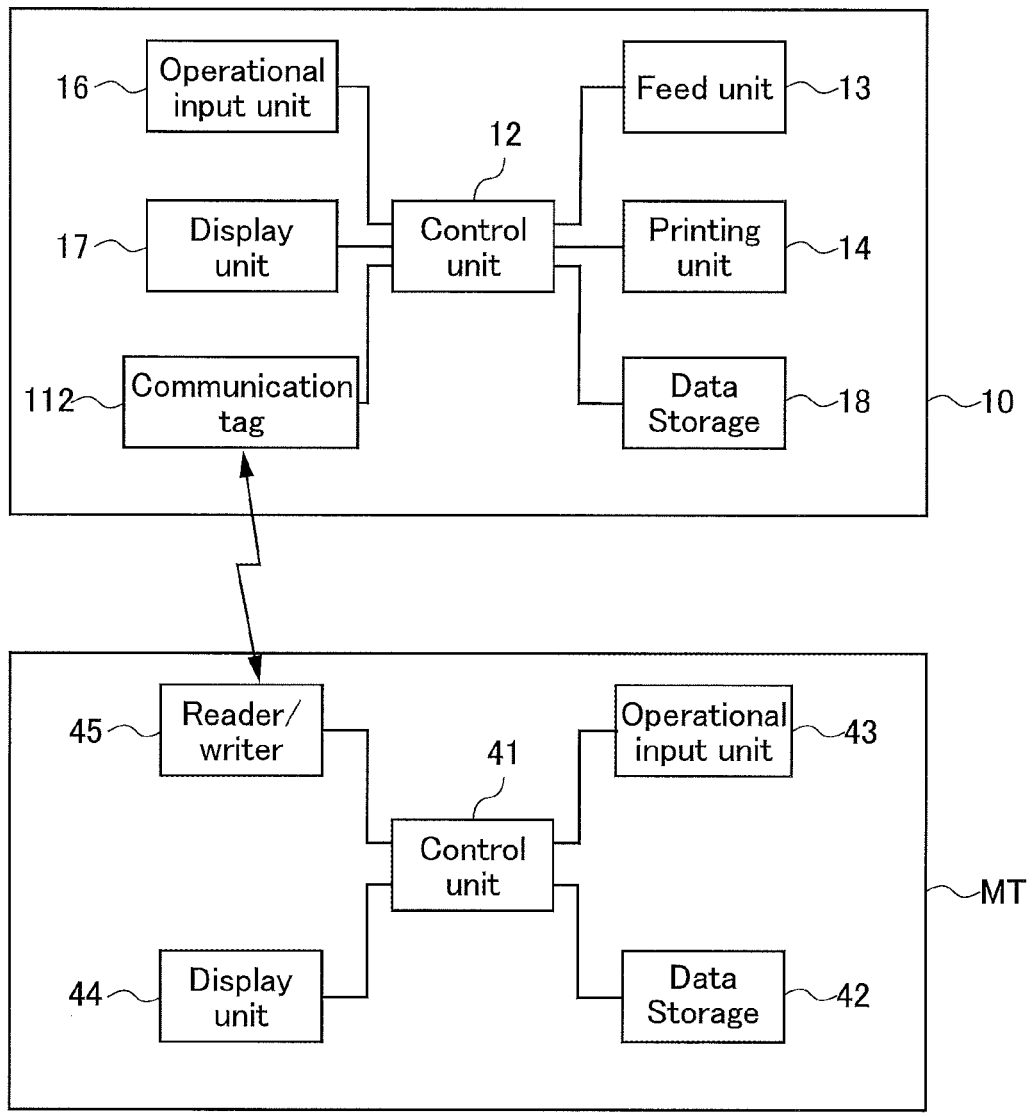
FIG. 12 is a block diagram showing configuration of the printer and the communication apparatus in the embodiment.

Next, configuration of the printer 10 and the communication device MT will be described with reference to FIG. 12. FIG. 12 is a block diagram showing the configuration of the printer 10 and the communication device MT in the present embodiment.

In an example of the present embodiment, the printer 10 stores a paper roll. A continuous paper, which includes a plurality of labels continuously aligned, is wound into the paper roll. The printer 10 is configured to print on the label and eject the same. As illustrated in FIG. 12, the printer 10 includes a control unit 12, a feed unit 13, a printing unit 14, an operational input unit 16, a display unit 17, a data storage 18, and the communication tag 112.

The control unit 12, including a microcontroller as a main component, wholly controls the printer 10. For example, the microcontroller included in the control unit 12 loads a firmware recorded in the data storage 18 and executes the firmware, thereby realizing a variety of functions. For example, the control unit 12 executes generation of print data, and executes control to the feed unit 13 and the printing unit 14 for printing.

The data storage 18 is a non-volatile recording device, and may be a solid state drive (SSD) such as a flash memory. The firmware mentioned above is recorded in the data storage 18.

The data storage 18 records configuration information for the printer 10. The configuration information for the printer 10 may be at least one of information regarding configuration for the printer 10, information of language selection for the printer 10, and information of interface configuration for the printer 10. The configuration information for the printer 10 together with the firmware is loaded to the control unit 12, and set up in the firmware.

The configuration of the printer 10 may be, but is not limited to, print speed, print density, label size (horizontal and vertical size), print method, sensor type, language, time zone, power save time, pitch correction, offset correction, near end setting for label, near end setting for ink ribbon, priority setting, or unit, for example.

The language selection for the printer 10 is a program language (page description language) for instructing drawing creation to the printer 10. The language selection may include a selection from a plurality of different languages.

The interface configuration for the printer 10 may be, but is not limited to, one of USB, RS232C, IEEE1284, Bluetooth (registered trademark), LAN, and WLAN.

The feed unit 13 includes a platen roller, a motor drive circuit, and a stepping motor, which are not illustrated. The feed unit 13 is configured to extract the continuous paper form the paper roll and feed the continuous paper. For example, based on a feed request from the control unit 12, the motor drive circuit drives the stepping motor that controls rotation of the platen roller, thereby allowing the continuous paper to be fed. A feed direction (i.e., a forward direction or a backward direction) and a feed amount are specified in the feed request from the control unit 12.

The printing unit 14 includes a thermal head and a head drive circuit, which are not illustrated. The continuous paper is pinched between the thermal head and the platen roller. Based on line data sequentially transmitted from the control unit 12, the head drive circuit electively flows current to heating elements (i.e., heats heating elements), thereby performing printing.

The operational input unit 16 receives an operation input to the printer 10 from a user. The operational input unit 16 may include an input button and an input interface circuit, for example. Based on a processing result by the control unit 12, the display unit 17 performs display output with respect to information of which a user should be informed.

The communication tag 112 includes an IC chip and an antenna as described above. The communication tag 112 obtains power through electromagnetic wave transmitted from the reader/writer 45 of the communication device MT, and performs short-range wireless communication with the reader/writer 45. Thus, activation of the communication tag 112 does not require activation of the printer 10 (that is, power-on status for the printer 10).

The IC chip in the communication tag 112 records at least one of information regarding a model name, version information, and a serial number of the printer 10. This information is read by the reader/writer 45 of the communication device MT.

The configuration information for the printer 10 that is received from the reader/writer 45 of the communication device MT may be written into the IC chip of the communication tag 112. The control unit 12, during its startup sequence after power on etc., reads the configuration information for the printer 10, which has been written into the communication tag 112, and runs the firmware with the configuration information. During the startup sequence after power on or an end sequence after power off, the control unit 12 may renew the configuration information in the data storage 18 with configuration information that are read from the communication tag 112.

The communication device MT includes a control unit 41, a data storage 42, an operational input unit 43, a display unit 44, and a reader/writer 45. The operational input unit 43 may preferably have a touch panel that receives a touch input. The operational input unit 43 may also have other input means that receives an input.

The control unit 41, including a microcontroller as a main component, loads an application program recorded in the data storage 42, into a RAM, and executes the application program.

The control unit 41 may be configured to control the reader/writer 45 so as to be operable, in response to an operation input through the operational input unit 43 by a worker.

The reader/writer 45 reads information from the communication tag 112 of the printer 10, or writes information to the communication tag 112. The control unit 41 may control the display unit 44 to display information read by the reader/writer 45. The control unit 41 may record information recorded by the communication tag 112, in the data storage 42.

(5) Communication Method

Next, the communication method according to the present embodiment will be described. The communication method according to the present embodiment is performed for reading information of the printer 10 or for writing information of the printer 10 by use of the communication device MT, without opening the product package 4 that stores the printer 10.

The product package 4 stores the printer 10 for delivery. Naturally, the printer 10 in the product package 4 is in power-off status. In such case, there is a need that a worker wishes to read information of the printer 10 in the product package 4, or write information into the printer 10, for example, for the purpose of confirming stock status of the printer(s) 10, or revising configuration for the printer 10 stored in the product package 4. Assuming particularly that quantity of the product package 4 is very large, if a worker had to: open the product package 4 one by one, and if needed, turn on the printer 10 to read information from or write information in, it would require vast amount of work.

In view of the above, the communication method according to the present embodiment allows for reading information from the printer 10 or for writing information in the printer 10, without opening the product package 4, and in a short period of time.

Sequences of a specific communication method according to the present embodiment will be explained below.

A worker moves the activated communication device MT close the communication mark M1 of the label PL, which is attached to the storage box 2 (that is, a worker passes the communication device MT over the communication mark M1). As described before, the communication mark M1 and the communication tag 112 are very close across the flat plate of the storage box. This close state is maintained thanks to the restriction part RS, thereby allowing for performing short-range wireless communication. That is, electromagnetic wave of a predetermined frequency, transmitted from the reader/writer 45, generates power at the communication tag 112, which initiates non-contact short-range wireless communication between the reader/writer 45 and the communication tag 112 without activating the printer 10.

Once the communication between the reader/writer 45 of the communication device MT and the communication tag 112 is initiated, the reader/writer 45 reads at least one of information regarding a model name, version information, and a serial number of the printer 10 from the communication tag 112, and records the information in the communication tag 112. At this time, the control unit 41 controls the display unit 44 to display the information recorded in the communication tag 112. Thereby, a worker can obtain the information of the printer 10 by seeing a screen of the communication device MT. Further, there is an advantage that information can be collectively obtained regarding the printer(s) 10 manufactured in a specific lot.

Further, once the communication between the reader/writer 45 of the communication device MT and the communication tag 112 is initiated, the reader/writer 45 writes the configuration information for the printer 10 into the communication tag 112. As described before, the configuration information for the printer 10 may be at least one of information regarding configuration for the printer 10, information of language selection for the printer 10, and information of interface configuration for the printer 10.

Then, the printer 10 is extracted from the product package 4. In the startup sequence after the printer 10 is turned on, the printer 10 reads the configuration information for the printer 10, which is recorded in the communication tag 112, and runs the firmware with the configuration information. Thus, writing the configuration information by the reader/writer 45 allows the configuration for the printer 10 to be revised (that is, the printer 10 is configured).

The control unit 41 may preferably record the configuration information for the printer 10 in the data storage 42, after the configuration information have been written into the communication tag 112.

In the present embodiment, a mobile printer has been exemplified. In a case in which the present invention is applied for a mobile printer, the following advantageous effect will be achieved.

In a case in which a printer of large size is stored in a storage box, very thick cushioning material made of foamed styrol etc. may be needed around the printer, taking impact resistance into consideration. Thus, a distance between a surface of the storage box and an exterior surface of the printer is likely to be long. Therefore, when performing short-range wireless communication is attempted by use of a communication device, a distance from the communication device to a communication tag may surpass a communication range, which ends up a fail to communicate.

In contrast, in case of a mobile printer, which does not require high impact resistance, air cushioning material may not be needed around the printer, or if needed, thin material suffices. Thus, a distance between a surface of the storage box and a communication tag can be set to be short. Therefore, in case of a mobile printer, short-range wireless communication as explained in the present embodiment is relatively easy to achieve.

An embodiment of a communication method, a storage box, and a storage box that stores an electrical apparatus according to the present invention has been described in detail; however, it should be noted that the present invention is not limited to the embodiment described above. The embodiment described above may be improved or revised in a variety of ways in such a manner that does not depart from the spirit of the present invention.

For example, information that is written into or read from a communication tag in the embodiment described above is merely an example, and such information may be defined as appropriate depending on an electrical apparatus to communicate with.

In the embodiment described above, an example has been described in which a surface to which the label PL including the communication mark M1 is a lateral face of the storage box 2. Nevertheless, the label PL may be attached to any surface of the storage box 2. Based on a surface to which the label PL is attached, that is, a position at which the communication mark M1 is displayed, those skilled in the art would modify arrangement of the interior member of the storage box 2 such that the communication mark M2 of the printer 10 corresponds to the communication mark M1.

1: Shipping unit
2: Storage box
4: Product package
5: Container box
10: Printer
11: Lateral face of Housing
111: Circuit board
112: Communication tag
12: Control unit
13: Feed unit
14: Printing unit
15: Accessories
16: Operational input unit
17: Display unit
20: Interior member
21, 22, 23, 24, 25, 26, 27, 281, 282, 291, 292: Flat plate
30: Exterior member
31: Lid part
32, 33: Flat plate part
35: Lateral part
31a: End part
35a: Engagement part
30h: Storing space
31h: Cutout part
MT: Communication device
41: Control unit
42: Data storage
43: Operational input unit
44: Display unit
45: Reader/writer
PL: Label
AR: Positioning mark
M1, M2: Communication mark

The invention claimed is:

1. A storage box configured to store a relatively small mobile printer therein, the mobile printer including a built-in antenna in the vicinity of a first region of a surface exposed to the outside of the mobile printer, the antenna being configured for non-contact short-range wireless communication with a communication device, the storage box comprising:
   a first exterior surface configured to be opened when the mobile printer is inserted into the storage box; and
   a second exterior surface including a predetermined position at which information is provided, the information indicating where the antenna is placed,
   wherein the predetermined position corresponds to the first region of the mobile printer when the mobile printer is placed in the storage box,
   wherein the first exterior surface is perpendicular to the second exterior surface when the storage box is in a closed state, and
   wherein the second exterior surface is configured to permit configuration information to be transmitted from the communication device to the built-in antenna, when the mobile printer is in a power-off status, such that the mobile printer is configured based on the configuration information when the mobile printer is powered on.

2. The storage box of claim 1, wherein a distance between the second exterior surface of the storage box and the antenna is less than a second distance between the antenna and a surface of the storage box other than the second exterior surface.

3. The storage box according to claim 1, wherein the configuration information is at least one of information regarding printer configuration, information of printer language selection, or information of printer interface configuration.

4. The storage box according to claim 1, wherein the second exterior surface is configured to permit the mobile printer to transmit at least one of information regarding a model name, version information, or a serial number of the mobile printer via the second exterior surface.

5. The storage box according to claim 1, further comprising a restriction part facing an interior surface inside the storage box, the interior surface corresponding to the second exterior surface, the restriction part being configured to restrict placement of the mobile printer in the storage box between the interior surface and the restriction part such that the first region of the mobile printer is close to the interior surface of the storage box when the mobile printer is placed in the storage box.

6. The storage box according to claim 1, further comprising a label attached on the predetermined position, wherein the information indicating where the antenna is placed is printed on the label.

7. The storage box according to claim 1,
wherein a first mark is displayed at the first region of the mobile printer,
wherein the information indicating where the antenna is placed is a second mark, and
wherein the first mark and the second mark are identical in shape.

8. A shipping unit configured to ship a plurality of mobile printers, the shipping unit comprising:
a plurality of storage boxes, each storage box configured for storing a mobile printer therein, the mobile printer including a built-in antenna in the vicinity of a first region of a surface exposed to the outside of the mobile printer, the antenna being configured for non-contact short-range wireless communication with a communication device, each storage box including:
an exterior surface including a predetermined position at which information is provided, the information indicating where the antenna is placed,
wherein the predetermined position corresponds to the first region of the mobile printer when the mobile printer is placed in the storage box; and
a container box configured for storing the plurality of storage boxes, the container box having a surface configured to be opened;
wherein the plurality of storage boxes are arranged in the container box such that the information indicating where the antenna is placed is facing the surface configured to be opened,
wherein the built-in antenna is configured to permit configuration information to be received from the communication device when the mobile printer is in a power-off status, such that the mobile printer is configured based on the configuration information when the mobile printer is powered on.

9. The shipping unit of claim 8, wherein each storage box further comprises
a first exterior surface configured to be opened when the mobile printer is inserted into the storage box,
wherein the exterior surface including the predetermined position is a second exterior surface,
wherein the first exterior surface is perpendicular to the second exterior surface when the storage box is in a closed state.

10. The shipping unit of claim 9, wherein the built-in antenna is further configured to permit configuration information to be received from the communication device when the storage box is in the closed state.

11. The shipping unit according to claim 9, further comprising a restriction part facing an interior surface inside the storage box, the interior surface corresponding to the second exterior surface, the restriction part being configured to restrict placement of the mobile printer in the storage box between the interior surface and the restriction part such that the first region of the mobile printer is close to the interior surface of the storage box when the mobile printer is placed in the storage box.

12. The shipping unit according to claim 8, wherein the configuration information is at least one of information regarding printer configuration, information of printer language selection, or information of printer interface configuration.

13. The shipping unit according to claim 8, wherein the exterior surface is configured to permit the mobile printer to transmit at least one of information regarding a model name, version information, or a serial number of the mobile printer via the exterior surface.

14. The shipping unit according to claim 8, further comprising a label attached on the predetermined position, wherein the information indicating where the antenna is placed is printed on the label.

15. The shipping unit according to claim 8,
wherein a first mark is displayed at the first region of the mobile printer,
wherein the information indicating where the antenna is placed is a second mark, and
wherein the first mark and the second mark are identical in shape.

* * * * *